Feb. 25, 1958 W. C. GATES 2,824,508
LATCH MECHANISM
Filed March 11, 1955 3 Sheets-Sheet 1
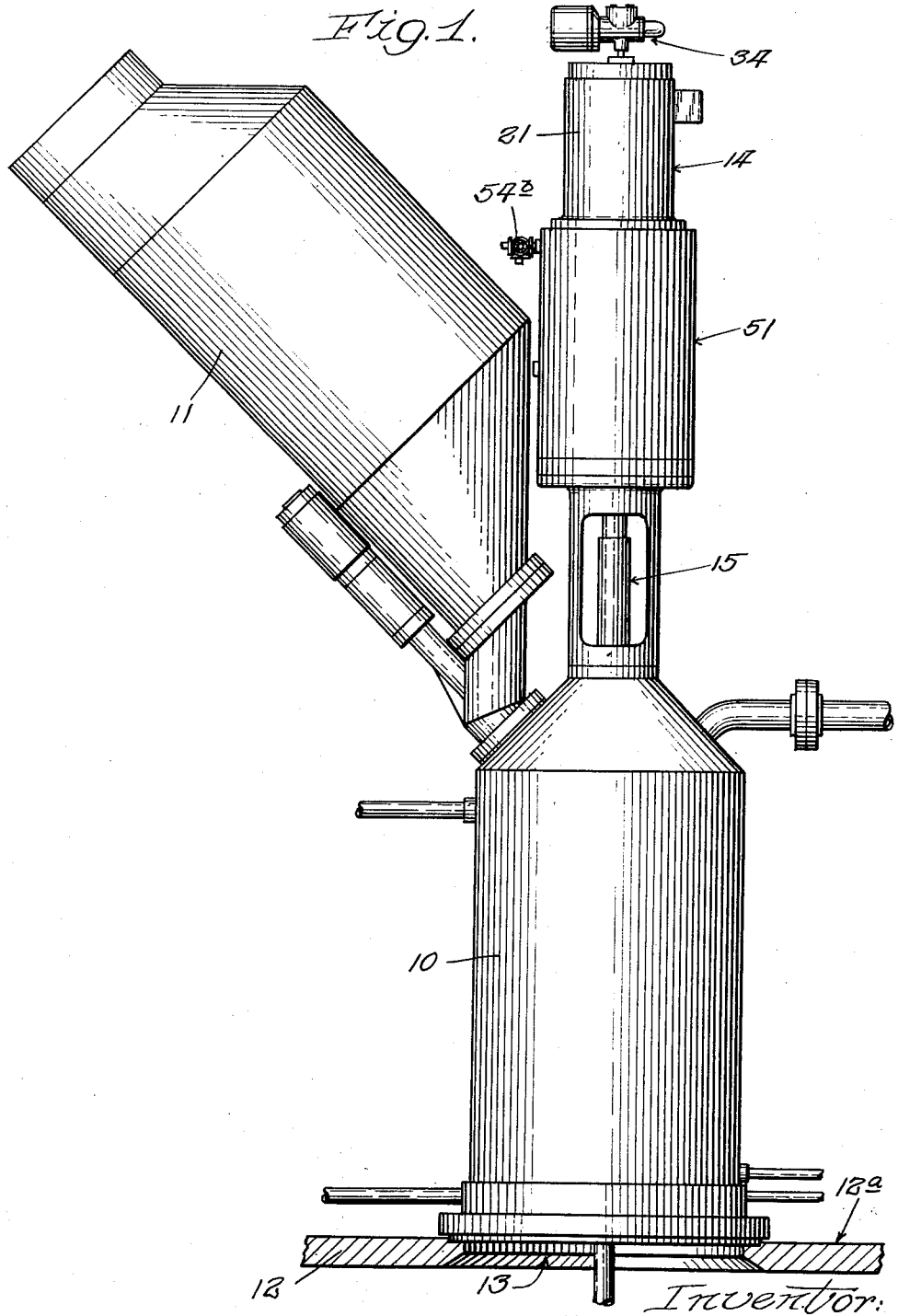

Feb. 25, 1958 W. C. GATES 2,824,508
LATCH MECHANISM
Filed March 11, 1955 3 Sheets-Sheet 2
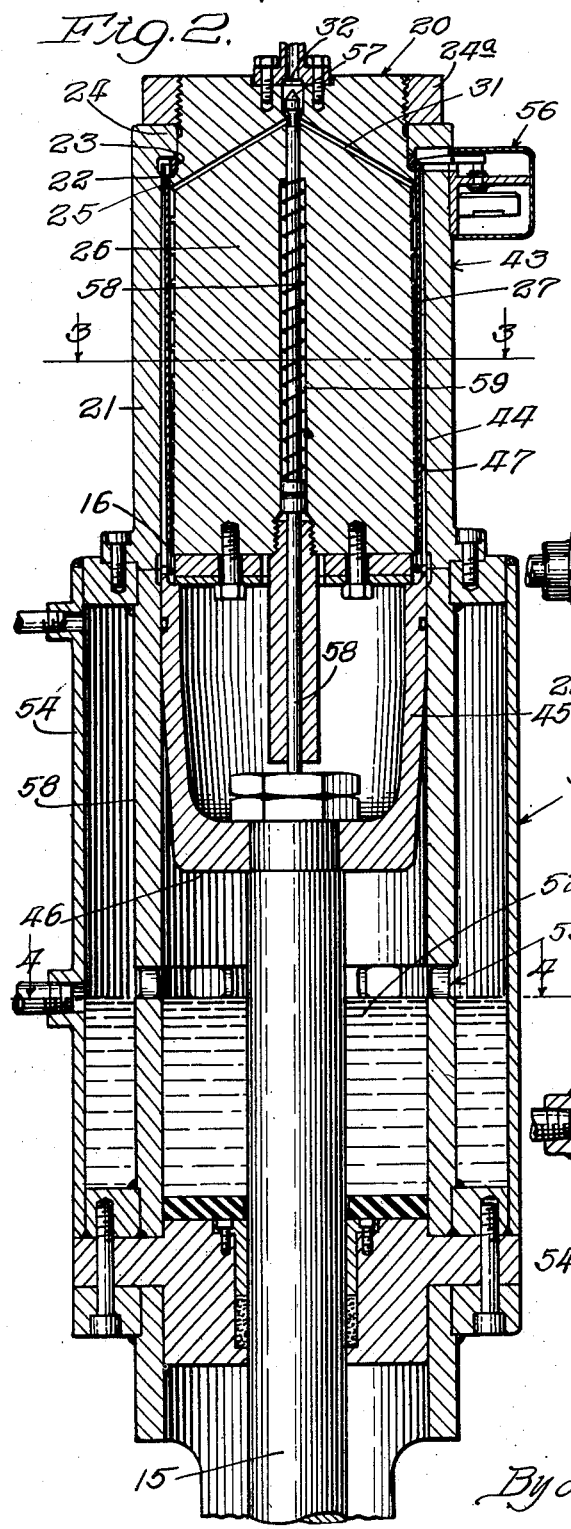
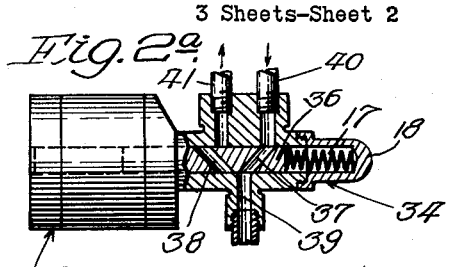
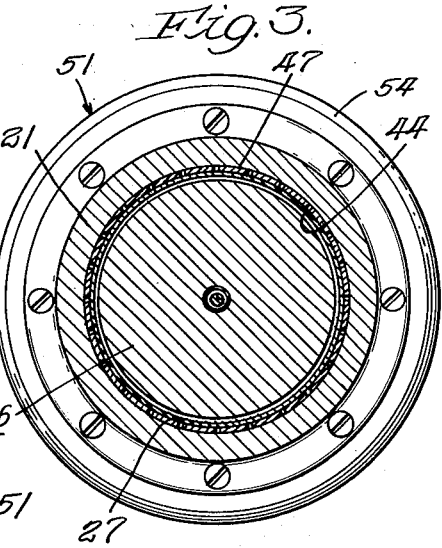
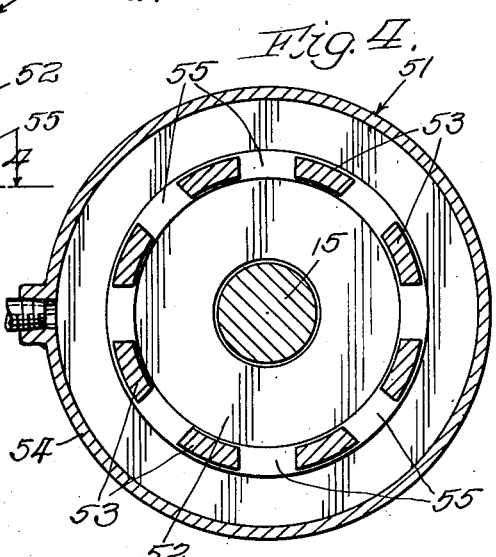
Inventor:
Wilbur C. Gates,
By Merriam, Lorch, Attys.

Feb. 25, 1958

W. C. GATES 2,824,508

LATCH MECHANISM

Filed March 11, 1955

Inventor:
Wilbur C. Gates,
By Merriam, Lorch,
Attys.

United States Patent Office 2,824,508
Patented Feb. 25, 1958

2,824,508

LATCH MECHANISM

Wilbur C. Gates, Flossmoor, Ill., assignor, by direct and mesne assignments, of one-half to Chicago Bridge & Iron Company, Chicago, Ill., a corporation of Illinois, and one-half to Baerguard, Inc., Chicago, Ill., a corporation of Illinois Application March 11, 1955, Serial No. 493,690

15 Claims. (Cl. 99—238)

This invention relates to a latch mechanism for securing two members movable with respect to each other, and more particularly to a latch that may have a very rapid release action.

Various types of equipment require a fastening or latching mechanism which possesses great holding strength; is capable of extremely rapid release; and can be operated a great many times without substantial wear or failure. Such a latch mechanism is essential, for example, in a vacuum puffing gun employed in puffing cereals. In such apparatus it is necessary to maintain a vacuum tight seal between a cooking chamber and an adjoining vacuum chamber whereby a very considerable pressure difference exists between opposing sides of the seal during the period that the cereal is being cooked under pressure. After cooking the cereal, it is necessary that the vacuum tight seal be released substantially instantaneously in order to fire the cereal from the pressurized cooking chamber into the adjoining vacuum chamber.

In some types of equipment a latch having the necessary strength to withstand a relatively high pressure differential may include threaded fastening means. In such a device, separation of the coupling elements inherently requires relatively gradual loosening. This type of fastener provides the desired strength but obviously is unsuitable for rapid opening of a moveable plate member employed to open and close an aperture between a high pressure cooking chamber and an adjacent vacuum chamber in a puffing gun.

In the past, such a plate member between the cooking chamber and the vacuum chamber of a puffing gun has been latched by attaching a swinging latch to the rim forming the aperture. This swinging latch engages complementary fastening means on the plate. By swinging the latch out of engagement with the complementary fastening means, the plate is released from its closed position. In order to unfasten the plate rapidly it is necessary to effect a sharp blow on the latch each time the plate is to be moved from a closed position to an open position. It is important to note that such a blow must overcome not only the inertia of the latch but also the very large frictional force existing between the latch and the cover plate which is pressed tightly against the latch by the pressure exerted on the plate within the cooking chamber of the gun. Great difficulties are presented both in providing means to produce such a blow and in strengthening the latch so that it can "take" repeated blows without suffering damage.

This invention provides a greatly improved latch mechanism which meets all of the desired requirements for use in effecting a vacuum tight seal against a very great pressure difference and then releasing the seal substantially instantaneously while the great pressure differential still exists.

The latching mechanism of this invention avoids all of the disadvantages mentioned above while providing a strong reliable closure and practically instantaneous release with substantially no shock whatsoever to the latch member, as by physical blows thereto.

To provide the holding force necessary for a vacuum tight connection, the latch mechanism of this invention relies solely upon frictional engagement of two or more complementary parts pressed together by means of fluid pressure exerted against one of these parts. Though secure and capable of holding a very large head of pressure, this connection may be broken substantially instantaneously by rapid removal of the fluid pressure exerted against one of the complementary parts. Since the surfaces of the complementary parts which are in frictional engagement are substantially smooth, any contact which may continue momentarily after the latch is tripped will not impede their very rapid separation.

The invention is illustrated in a preferred embodiment in the accompanying drawings, in which:

Figure 1 is a side elevational view of a cereal vacuum puffing gun incorporating the latch mechanism of this invention;

Figure 2 is a fragmentary, sectional view showing one embodiment of the latch mechanism of this invention;

Figure 2A is a fragmentary, side elevational view, partly in section, showing the solenoid switch and associated valve employed with the latch mechanism shown in Figure 2;

Figure 3 is a sectional view taken substantially along line 3—3 of Figure 2;

Figure 4 is a sectional view taken substantially along line 4—4 of Figure 2;

*Vacuum puffing gun*

Figure 5:
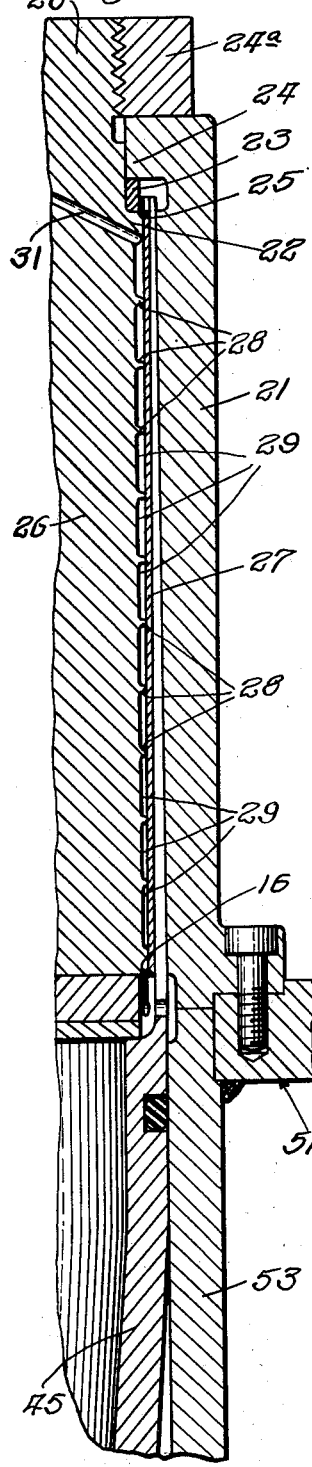
Figure 5 is an enlarged, fragmentary, sectional view showing the two complementary parts which are capable of being pressed together by fluid pressure.

Figure 1 shows a cereal vacuum puffing gun incorporating the latch mechanism of this invention.

As here shown, the cereal to be puffed is introduced into a cooking chamber 10 from a preliminary treating vessel 11 mounted above it. The cooking chamber 10 is mounted on the top wall 12 of a vacuum chamber 12a.

A door member of the gun (not shown) serves to open and close an aperture 13 between the cooking chamber 10 and the vacuum chamber 12a. This gun door is adapted to form a vacuum tight seal with the rim surrounding the aperture 13 in the top wall 12 of the vacuum chamber 12a when in closed position. The cooking process is carried on in the cooking chamber 10 at a pressure well above atmospheric pressure (for example, at a pressure of from 35 p. s. i. gauge to 250 p. s. i. gauge), while the pressure on the other side of the gun door in the vacuum chamber 12a is maintained at a pressure as low as 0.1 inch of mercury absolute and lower. Consequently, a very great force is exerted downwardly on this door when it is in the closed position and a vacuum condition is maintained in the vacuum chamber 12a. This force tends to force the gun door downwardly to its open position.

A latch mechanism 14 is here shown located above the gun door and spaced therefrom. It is connected to the gun door by means of a rod 15. It is the latch mechanism 14 which serves as the holding force for retaining the gun door in its closed position.

As will be explained in detail below, the latch mechanism 14 is adapted to produce a strong, reliable closure holding force during the cooking process, and then enables substantially instantaneous opening of the gun door when it is desired to fire the cooked cereal into the vacuum chamber 12a.

Expansion plug

The assembled latch metchanism of this invention is shown in detail in Figures 2 and 2A, with the gun door to aperture 13 in closed position.

As here shown, a stationary, generally cylindrically-shaped expansion plug 20 is nested in a generally cylindrically-shaped retainer shell 21. This plug has an outwardly extending shoulder 22 at its top portion which presses against a spacer ring 23 snugly against the bottom of an inwardly extending support shoulder 24 forming the top of retainer shell 21. A threaded top portion of expansion plug 20 engages a nut 24a bearing against the top shoulder 24 of retainer shell 21. In this way the expansion plug 20 is fixedly mounted within the retainer shell 21.

It is important to note that the expansion plug 20 is so mounted within retainer shell 21 as to be spaced slightly from the sidewalls of the retainer shell forming a narrow annular space into which complementary clamping means, described below, is inserted in the holding position of the latch mechanism.

As here shown, expansion plug 20 comprises a generally cylindrically-shaped core 26 surrounded by a cylindrically-shaped thin metal expansible sleeve 27.

Referring to Figure 5, cylindrically-shaped metal core 26 is here shown as having a slight inward taper when moving from the bottom of the core to the top portion. The outer cylindrical surface of the metal core 26 contains spaced and parallel ridges 28 about the cylindrical portion. The external peripheries of these ridges define a curved surface which, in the embodiment here shown, form a right cylinder.

Figure 6:
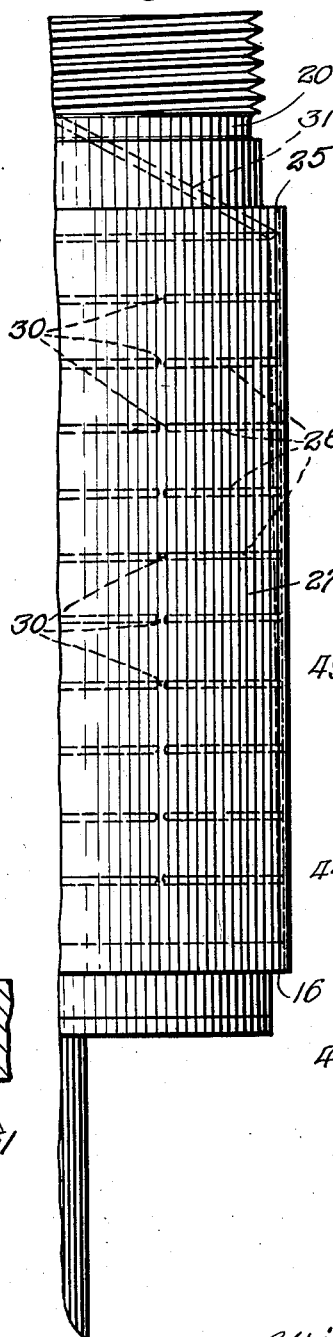
Figure 6 is an enlarged, fragmentary, side elevational view of the expansion plug member of the latch mechanism shown in Figure 2.

Expressed in another way, the metal core 26 may be described as having a series of parallel grooves 29 extending around the outer surface, which grooves are shallower at the bottom end of the core and deeper at the top portion. As best seen in Figure 6, the ridges 28 are each provided with at least one notch 30, which provides channel communication between adjacent grooves 29.

The thin, expansible metal sleeve 27 surrounds the cylindrical portion of core 26, being press fitted against the ridges 28. As a result, a series of parallel, annular spaces between core 26 and metal sleeve 27 are formed. Notches 30 in the ridges serve as channel communications between the adjacent annular spaces. The uppermost annular groove 29 communicates through a passageway 31 in the upper portion of the core 26 with an inlet opening 32 at the top of the metal core to permit flow of fluid into and out of the annular grooves 29.

It is preferred that thin, expansible metal sleeve 27 be of substantially uniform thickness. Referring to Figures 2, 5 and 6, this sleeve is here shown as securely attached at its top and bottom peripheries to the metal core 26 at regions 25 and 16.

Application of fluid pressure at inlet 32 results in substantially uniform expansion of the thin metal sleeve 27. It is preferred that this metal sleeve be prestressed so that a predetermined amount of fluid pressure may be applied to the fluid in expansion plug 20, thereby bringing the sleeve into contact with the complementary fastening or clamping means and the retainer shell 21. Additional fluid pressure results in frictional engagement between the thin metal sleeve 27 and the complementary fastening or clamping means described below.

The parts of the latch mechanism of this invention are designed for snug, close fit and the distance the sleeve can expand when the latch is closed is very small, i. e., of the order of about 0.002 inch. It is preferred that the cylindrically-shaped expansion plug 20 be designed to expand practically uniformly throughout its length. It is to be noted that the ridges 28 located in the center portion of the metal core 26 may have a slightly smaller external diameter than the ridges at the top and bottom portions of the core, and sleeve 27 may be prestressed to fit the resulting modified cylindrically-shaped metal core 26 very tightly. Consequently the slightly greater flexibility of the center portion of the sleeve as compared to the upper and lower portions may be compensated for to bring the outer surface of the sleeve, when fully expanded, into a substantially perfect right angle cylindrical shape.

It is preferred that expansion plug 20 have a circular cross section through sleeve 27. However, the external surface of sleeve 27 may be of any surface generated by a straight line parallel with a fixed straight line through the center of the plug 20.

In order that thin metal sleeve 27 be given a substantially uniform predetermined thickness, it is preferred that the sleeve be formed in the following manner. The metal core 26 is first machined to produce the grooves 29 and to leave spaced, substantially parallel ridges 28 about its external surface. The external diameters of these ridges are substantially the same as the external diameter of the original cylindrically-shaped core 26. A series of notches 30 are then cut in the ridges 28 so that each adjacent groove 29 is connected and fluid can flow rapidly in and out of these grooves. A cylindrically-shaped metal sleeve 27 is then tightly fitted over the resulting rigid core 26 and welded to the core at its top and bottom peripheries 25 and 16, respectively. The outer surface of the sleeve 27 is then machined down to the desired thickness. In this way a substantially smooth outer surface and a substantially uniform thickness of the metal sleeve is achieved.

Pressure switching means

Referring to Figure 2A, a pressure switching means 34 is employed to apply and release fluid pressure to the thin metal sleeve 27 by passage of fluid through inlet 32 of the metal core 26, conduit 31 and into grooves 29. As here shown, this switching means 34 is mounted atop latch mechanism 14 in Figure 1 and comprises an electric powered solenoid 35 actuated by an electric switch (not shown) whenever it is desired to lock the latch or unlock the latch and thereby fire the vacuum puffing gun. A movable solenoid bolt 36 is mounted in a slot in a casing 18. One end of this bolt is connected to the solenoid and the other bears against a spring 17 in the casing. This casing contains an exhaust conduit 41 leading to the atmosphere and a fluid inlet conduit 40 leading to the source of fluid pressure. A third conduit 39 in the casing connects the inlet 32 in the core 26 with the slot.

The solenoid bolt 36 contains two channels 37 and 38 extending through the bolt and so positioned that, when the bolt in the casing slot is moved to its closed terminal position in the slot, inlet conduit 40 and core inlet 32 are connected through channel 37. When the bolt is moved to its release position, i. e., to the other end of the slot, core inlet 32 is then connected with exhaust conduit 41 which vents to the atmosphere through channel 38 so as to release pressure in the grooves 29.

In order to achieve rapid release action as required in a cereal vacuum puffing gun, it is preferred that the fluid be a liquid such as oil. Under such conditions, the pressure exerted against the thin metal sleeve 27 is released instantaneously when the electric solenoid 35 forces the solenoid bolt 36 to the release position so that core inlet 32 is connected to the atmosphere.

In the event that longer release time is desired, it is preferred that the fluid used be a gas and, depending upon the rate of movement of the bolt 36 and the size of the openings leading to the atmosphere, the rate of release may be controlled to a certain degree.

Retainer element

The assembled expansion plug 20 is mounted in spaced relation with a generally cylindrically-shaped retainer shell 21. As here shown, the lower portion of the retainer shell 21 is somewhat thinner than the upper portion here indicated as 43. As a result, tapering of the inner surface of the retainer shell occurs forming a frustum-shaped surface which aids in producing increased rapidity in latch release as explained more fully below.

Fingers

Complementary fastening or clamping means here shown in the form of metal fingers 44 are provided which, in the closed position of the latch, are inserted into the annular space between the expandable thin metal sleeve 27 of the expansion plug 20 and the retainer shell 21 to a point of engagement with expansion plug 20 and the retainer shell 21. This fastening means is comprised of a series of relatively thin metal fingers 44 extending away from a collar 45 mounted on a plunger 46. The plunger 46 is in turn mounted on one end of a rod 15. The other end of rod 15 is connected to the gun door (not shown) adapted to open and close the aperture between the cooking chamber 10 and the vacuum chamber 12a.

Figure 7:
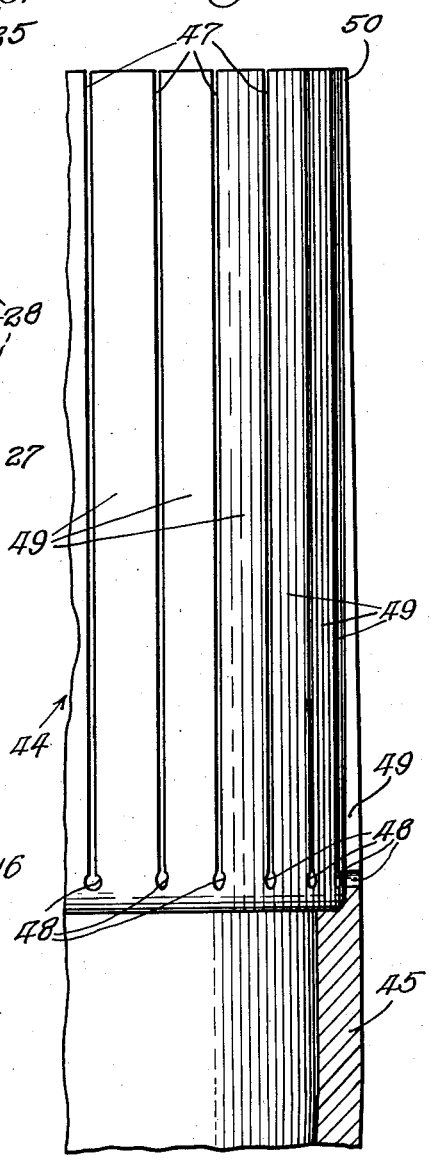
Figure 7 is an enlarged, fragmentary, sectional view of the finger elements of the latch mechanism shown in Figure 2.

Referring to Figure 7, the metal fingers 44 are here shown as being relatively wide, thin and long. It is preferred that each finger be separated from the adjacent finger by a narrow slot 47, which slot terminates at the lower end in the form of a circular hole 48. When the latch mechanism of this invention is in the holding or closed position, metal fingers 44 are positioned within the annular space between thin sleeve 27 and retainer shell 21. They are held in the holding position by means of fluid pressure being exerted against the thin sleeve 27, which, in turn, expands forcing the resilient fingers to bend slightly outwardly against the inner surface of the retainer shell 21. The fluid force applied against the sleeve 27 and fingers 44, is such as to prevent movement of the fingers between the sleeve 27 and outer shell 21 when there is a pressure differential of, for example, between 250 p. s. i. gauge and 0.1 inch of mercury absolute tending to force the fingers downwardly. It is to be noted that, upon release, the fingers 44 return to their normal position.

The holes 48 which form the termination of the narrow slots 47 forming the fingers aid in reducing the fatigue effects caused by constant working of the fingers at the base thereof.

As here shown, fingers 44 are tapered in thickness, being thicker at the base 49 and thinner at the top portion 50. In the embodiment shown, tapering is produced on the outer surface of the fingers in such a manner that it complements the tapering possessed by the inner surface of the retainer shell 21. The rate of tapering is preferably very small, for example, about .001 inch per inch of length of the fingers. In this way efficient frictional engagement or holding contact as well as rapid release is achieved.

Figures 2 and 5 show the fingers in the holding position whereby they are in frictional engagement with expansion plug 20 and retainer shell 21. This position of engagement results in closing the aperture connecting the vacuum chamber 12a of the puffing gun and the cooking chamber 10.

It is readily seen that when the latch mechanism is in the holding or closed position, the fingers 44 are in contact with the outer surface of the thin metal sleeve 27 and the inner surface of the retainer shell 21. It is preferred to provide lubrication of the contacting surfaces with oil so as to avoid galling or scoring of the surfaces upon rapid release.

In order to further reduce wear of the contact surfaces, the fingers may be spaced slightly from the sleeve 27 when no pressure is applied to the expansion plug 20.

Frictional engagement of the fingers

It is important to note that when the sleeve 27 is expanded outwardly as a result of applying fluid pressure against its inner surface, the fingers are then pressed against retainer shell 21. The amount of fluid pressure exerted is very large so as to make the frictional holding force great. This prevents movement of the rod 15 and plunger 46 away from the expansion plug 20 and retainer element 21 which are fixedly connected.

The frictional force produced with the embodiment of this invention, as shown in Figure 2, has been found sufficient to hold a door two inches or more in diameter against a pressure in the cooking chamber of 50 to 250 p. s. i. gauge and a pressure in the vacuum chamber of 0.1 inch of mercury absolute or less.

The force with which the applied fluid pressure presses the sleeve 27 against the fingers 44 and in turn against the retainer shell 21 is sufficiently great to overcome the lubricating effect of the oil contained on the surfaces of these elements and cause substantially a metal to metal contact with its concomitant high coefficient of friction.

The very slight taper in the contact area between fingers 44 and retainer shell 21 does not decrease, to any great extent, the frictional force retaining the latch in the holding position.

For the same reason there may be an inward taper from the bottom portion to the top portion of the fingers 44, if desired, without any serious loss of holding strength in the latch mechanism.

Other fastening means

If desired, fingers 44 may be replaced by a solid walled extension of collar member 45 and expansion plug 20 may be reduced in diameter. The extended collar 45 then acts as a retainer element against which thin metal sleeve 27 is pressed under adequate fluid pressure to form a friction holding unit. Retainer shell 21 then acts as a guide.

It is preferred to have thin resilient fingers 44. The resiliency of such fingers permits frictional engagement between the expansion plug 20 and the finger elements 44 extending from the plunger 46. In addition, there is frictional engagement between these fingers and retainer shell 21. As a result, the area of frictional surface available for securing the latch in its holding position is greatly increased.

Because of the resiliency of the fingers 44, alignment of the moving parts which are brought together when the latch is in a holding position is far less critical than if the complementary clamping means is a rigid body. As a result, the closure is more reliably formed and wear on the moving parts is reduced considerably.

The frictional surface available for producing the holding action of the latch mechanism may be further increased by forming the fingers 44 of the plunger 46 in two concentric circular arrangements. To complement these fingers, one expansion plug is positioned concentrically within another to provide two concentric annular spaces to receive the two groups of fingers.

Firing action

In order to release the latch mechanism from its holding position and thus fire the material from the cooking chamber 10 into the vacuum chamber 12a, the solenoid bolt 36 is moved by the solenoid switch 35 from the holding position to the release position whereby inlet 32 in the core 26 is connected to the atmosphere through conduit 39, channel 38 and exhaust conduit 41. Thin metal sleeve 27 contracts rapidly to its normal cross sectional area against the ridges 28 of the core 26. The contracting force of sleeve 27 from its position of causing contact of fingers 44 with retainer shell 21 forces the excess oil or other fluid rapidly out of the parallel grooves 29.

As soon as the force of frictional contact has been reduced to the point that this frictional force is no longer great enough to oppose the downward force produced on the closed gun door by the difference in pressures in the cooking chamber 10 and the vacuum chamber 12a, plunger 46 is caused to move downwardly away from the expansion plug 20, It is to be noted that sleeve 27 contracts quickly to its normal size, the contraction being produced by the same force which was necessary in causing contact of sleeve 27 with fingers 44 and these fingers in contact with retainer shell 21. Secondly, movement of plunger 46 to any extent whatever breaks the contact between tapered fingers 44 and tapered retainer wall 21.

Utilization of a liquid as the fluid results in practically instantaneous release of the frictional force holding the fingers 44 against the retainer shell 21, when the liquid pressure is vented to the atmosphere, since liquids are substantially incompressible.

If for some reason a slower release action is desired, the fluid employed for the latch pressure may be a gas. Being compressible, the gas will require a while to expand as it passes to the atmosphere. The frictional force exerted by the main clamping means of the latch is thus reduced more slowly and acts as a drag on the moving parts of the latch, slowing up the release action.

It is preferred to employ an oil dash pot 51 to deaccelerate and finally stop the opening movement of the plunger 46 and rod 15, and the gun door of the puffing gun after firing. A liquid 52 of suitable viscosity is contained in a double housing comprised of two walls 53 and 54. The fluid is permitted to pass from the inner housing to the outer housing through ports 55. This arrangement is shown in section in Figure 4.

The bottom of plunger 46 is here shown as tapered so that when it moves downwardly the space available for the liquid decreases, thus producing a damping action.

To return the plunger 46 to the holding position, air pressure from a source not shown is applied to the space between the two walls 53 and 54 forming the double housing at an entry above the level of the liquid 52 by means of an air inlet pipe 54a leading from the source of air pressure to a hole in the outer wall 54. A three way valve 54b in the air inlet pipe 54a enables one to apply the air pressure in order to return the plunger 46 to the holding position and to release this air pressure prior to firing the gun.

*Safety devices*

Two safety devices are provided in the embodiment shown in Figure 2. One of these is designed to prevent application of fluid pressure to expansion plug 20 before fingers 44 have moved into a position of engagement with sleeve 27 and retainer element 21. The other prevents application of pressure after these elements have moved out of their position of engagement.

As to the former safety device, an electric switch 56 is actuated by pressure from the tip of one of the fingers 44 after the fingers have been completely inserted into their position of engagement with the other clamping means. This electric switch is in an interlock circuit with solenoid 35. Until it is actuated, solenoid 35 cannot be energized to connect conduits 39 and 40 through channel 37.

Safety valve 57 prevents application of fluid pressure to passageway 31 in the plug after firing of the puffing gun, even if solenoid 35 happens to jam in a position in which conduit 37 connects conduits 39 and 40 continuously. Safety valve 57 is carried by rod 58. This rod is normally biased by spring 59 in a position which holds valve 57 so as to block any communication between passageway 31 and the source of fluid pressure. When plunger 46 is in its fully inserted position, the plunger presses against rod 58 to force valve 57 open. However, as soon as the gun has fired and plunger 46 moved from its fully inserted position, spring 59 forces valve 57 closed again so that additional fluid pressure can in no event be impressed upon the expansion plug.

The above detailed description of this invention is given for clearness of understanding only. No unnecessary limitations should be understood therefrom, as modifications will be obvious to those skilled in the art.

I claim:

1. Latch mechanism for a gun or the like comprising a firing member and an abutting wall interfacially positioned to each other, an expansion member contiguous the interface of the firing member and wall, fluid pressure means for expanding the expansion member to bring the firing member and wall into sealing engagement and means for releasing the fluid pressure whereby the gun is fired.

2. Latch mechanism as set forth in claim 1 in which the firing member has a group of thin fingers between the wall and expansion member.

3. Latch mechanism as set forth in claim 1 in which a group of fingers are carried by the firing member which are brought into sealing engagement with the wall by the expansion member.

4. Latch mechanism as set forth in claim 1 in which a group of fingers are carried by the firing member, the fingers having only face-to-face contact with the wall.

5. A latch mechanism for securing and releasing two members movable with respect to each other, which comprises: an expansion plug element attached to one of the members to be secured, said plug being adapted to expand resiliently in cross sectional area upon application of fluid pressure thereto and to contract upon removal of said pressure; a retainer element surrounding the expansion plug in spaced relation thereto, said retainer element being attached to said member to be secured; a plurality of resilient fingers attached to the other member to be secured, said fingers extending into the space between the expansion plug and the retainer element in the holding position and being adapted to be pressed into frictional holding contact with the surfaces of the expansion plug element and the retainer element whenever sufficient fluid pressure is applied to the expansion plug while the fingers are in the holding position; means for applying a predetermined amount of fluid pressure to the expansion plug when the fingers are in the holding position; and means for releasing said fluid pressure causing release of frictional holding contact between the expansion plug element, the fingers, and the retainer element.

6. A latch mechanism for securing and releasing two members movable with respect to each other, which comprises: an expansion plug attached to one of said members to be secured, said plug having an external sleeve adapted to expand resiliently in cross sectional area upon application of fluid pressure to the plug and to contract upon removal of said pressure; a retainer element surrounding the expansion plug in spaced relation thereto, said retainer element being attached to said member to be secured; a plurality of resilient fingers attached to the other member to be secured, said fingers extending into the space between the expansion plug and the retainer element in the holding position and being adapted to be pressed into frictional holding contact with the surfaces of the sleeve and the retainer element whenever sufficient fluid pressure is applied to the plug while the fingers are in the holding position; means for applying a predetermined amount of fluid pressure to the expansion plug when the fingers are in the holding position; and means for releasing the fluid pressure causing release of frictional holding contact between the sleeve, the fingers, and the retainer element.

7. A latch mechanism for securing and releasing two members movable with respect to each other, which comprises: an expansion plug attached to one of said members to be secured, said plug including a solid metal core with an inlet for application of fluid pressure thereto and a metal sleeve surrounding the core forming an annular space between a portion of the core and the sleeve, said sleeve being attached at both ends to said core, said annular space being in communication with the fluid pressure inlet in the core, and said sleeve being adapted to expand resiliently in cross sectional area upon application of a predetermined amount of fluid pressure to the plug and to contact upon removal of said pressure; a retainer element surrounding the expansion plug in spaced relation to the sleeve of the plug, said retainer element being attached to said member to be secured; a plurality of resilient fingers attached to the other member to be secured, said fingers extending into the space between the expansion plug and the retainer element in the holding position and being adapted to be pressed into frictional holding contact with the surfaces of the sleeve and the retainer element whenever sufficient fluid pressure is applied to the plug while the fingers are in the holding position; means for applying a predetermined amount of fluid pressure to the expansion plug when the fingers are in the holding position; and means for releasing the fluid pressure causing release of frictional holding contact between the sleeve, the fingers, and the retainer element.

8. A latch mechanism for securing and releasing two members movable with respect to each other, which comprises: an expansion plug element attached to one of said members to be secured, said plug including a solid metal core with an inlet for application of fluid pressure thereto and a metal sleeve surrounding the core attached at both ends to the core, said core having spaced parallel ridges about its outer surface pressing tightly against the inner surface of said sleeve forming a plurality of annular spaces between the core and the sleeve with one of said spaces communicating wtih the fluid pressure inlet and each of said ridges having at least one transverse passage to provide communication between adjoining annular spaces, and said sleeve being adapted to expand resiliently in cross sectional area upon application of a predetermined amount of fluid pressure to the plug and to contract upon removal of said pressure; a retainer element surrounding the expansion plug in spaced relation thereto, said retainer being attached to said member to be secured; a plurality of resilient fingers attached to the other member to be secured, said fingers extending into the space between the expansion plug and the retainer element in the holding position and being adapted to be pressed into frictional holding contact with the surfaces of the sleeve and the retainer element whenever sufficient fluid pressure is applied to the plug while the fingers are in holding position; means for applying a predetermined amount of fluid pressure to the expansion plug when the fingers are in the holding position; and means for releasing the fluid pressure causing release of frictional holding contact between the sleeve, and the fingers, and the retainer element.

9. A latch mechanism for securing and releasing two members movable with respect to each other, which comprises: an expansion plug element attached to one of said members to be secured, said plug being adapted to expand resiliently in cross sectional area upon application of fluid pressure thereto and to contract upon removal of said pressure; a retainer element surrounding the expansion plug in spaced relation thereto, said retainer element being attached to said member to be secured; a plurality of resilient fingers attached to the other member to be secured, said fingers extending into the space between the expansion plug and the retainer element in the holding position and being adapted to be pressed into frictional holding contact with the surfaces of the expansion plug element and the retainer element whenever sufficient fluid pressure is applied to the expansion plug while the fingers are in the holding position, said fingers being thicker from their outer to their inner faces at the base than they are at the tip; means for applying a predetermined amount of fluid pressure to the expansion plug when the fingers are in the holding position; and means for releasing said fluid pressure causing release of frictional holding contact between the expansion plug element, the fingers, and the retainer element.

10. The latch mechanism of claim 9 in which each of the fingers is spaced from the adjacent finger at either side by a narrow slit terminating in an enlarged opening at the base of the finger.

11. A latch mechanism for securing and releasing two members movable with respect to each other, which comprises: an expansion plug element attached to one of said members to be secured, said plug including a solid metal core with an inlet for application of fluid pressure thereto and a metal sleeve surrounding the core attached at both ends to the core, said core having spaced parallel ridges about its outer surface pressing tightly against the inner surface of said sleeve forming a plurality of annular spaces between the core and the sleeve with one of said spaces communicating with the fluid pressure inlet and each of said ridges having at least one transverse passage to provide communication between adjoining annular spaces, and said sleeve being adapted to expand resiliently in cross sectional area upon application of a predetermined amount of fluid pressure to the plug and to contract upon removal of said perssure; a retainer element surrounding the expansion plug in spaced relation thereto, said retainer being attached to said member to be secured; a plurality of resilient fingers attached to the other member to be secured, said fingers extending into the space between the expansion plug and the retainer element in the holding position and being adapted to be pressed into frictional holding contact with the surfaces of the expansion plug element and the retainer element whenever sufficient fluid pressure is applied to the expansion plug while the fingers are in the holding position, the inner faces of said fingers forming substantially a cylindrical surface, the fingers being thicker from their outer to their inner faces at the base than they are at the tip; means for applying a predetermined amount of fluid pressure to the expansion plug when the fingers are in the holding position; and means for releasing said fluid pressure causing release of frictional holding contact between the expansion plug element, the fingers, and the retainer element.

12. A latch mechanism for securing and releasing two members movable with respect to each other, which comprises: an expansion plug element attached to one of said members to be secured, said plug including a solid metal core with an inlet for application of fluid pressure thereto and a thin metal sleeve surrounding the core attached at both ends to the core, said core having spaced parallel ridges about its outer surfaces pressing tightly against the inner surface of said sleeve forming a plurality of annular spaces between the core and the sleeve with one of said spaces communicating with the fluid pressure inlet and each of said ridges having at least one transverse passage to provide communication between adjoining annular spaces, the radial depth of said annular spaces being greater the nearer the space is to the fluid pressure inlet, and said sleeve being adapted to expand resiliently in cross sectional area upon application of a predetermined amount of fluid pressure to the plug and to contract upon removal of said pressure; a retainer element surrounding the expansion plug in spaced relation thereto, said retainer being attached to said member to be secured to a plurality of resilient fingers attached to the other member to be secured, said fingers extending into the space between the expansion plug and the retainer element in the holding position and being adapted to be pressed into frictional holding contact with the surfaces of the expansion plug element and the retainer element whenever sufficient fluid pressure is applied to the expansion plug while the fingers are in the holding position, the inner faces of said fingers forming substantially a cylindrical surface, and the fingers being thicker from their outer to their inner faces at the base than they are at the tip, each of the fingers being spaced from the finger on either side by a narrow slit terminating in an enlarged opening at the base of the finger; means for applying a predetermined amount of fluid pressure to the expansion plug when the fingers are in the holding position; and means for releasing said fluid pressure causing release of frictional holding contact between the expansion plug element, the fingers, and the retainer element.

13. A latch mechanism for securing and releasing two members movable with respect to each other, which comprises: an expansion plug element attached to one of said members to be secured, said plug including a solid metal core with an inlet for application of fluid pressure thereto and a thin metal sleeve surrounding the core attached at both ends to the core, said core having spaced parallel ridges about its outer surface pressing tightly against the inner surface of said sleeve forming a plurality of annular spaces between the core and the sleeve with one of said spaces in communication with the fluid pressure inlet and each of said ridges having at least one transverse passage to provide communication between adjoining annular spaces, and said sleeve being adapted to expand resiliently in cross sectional area upon application of a predetermined amount of fluid pressure to the plug and to contract upon removal of said pressure; a retainer element surrounding the expansion plug in spaced relation thereto, said retainer being attached to said member to be secured; a plurality of resilient fingers attached to the other member to be secured, said fingers extending into the space between the expansion plug and the retainer element in the holding position and being adapted to be pressed into frictional holding contact with the surfaces of the sleeve and the retainer element whenever sufficient fluid pressure is applied to the plug while the fingers are in the holding position; means for releasing the fluid pressure causing release of frictional holding contact between the sleeve, the fingers, and the retainer element; a safety switch adapted to be actuated by removal of said fingers from their holding position between the sleeve and retainer element; and means energizing said fluid pressure releasing means in response to the actuation of the safety switch.

14. A latch mechanism for securing and releasing two members movable with respect to each other, which comprises: an expansion plug element attached to one of said members to be secured, said plug including a solid metal core with an inlet for application of fluid pressure thereto and a thin metal sleeve surrounding the core attached at both ends to the core, said core having spaced parallel ridges about its outer surface pressing tightly against the inner surface of said sleeve forming a plurality of annular spaces between the core and the sleeve with one of said spaces communicating with the fluid pressure inlet and each of said ridges at least one transverse passage to provide communication between adjoining annular spaces, and said sleeve being adapted to expand resiliently in cross sectional area upon application of a predetermined amount of fluid pressure to the plug and to contract upon removal of said pressure; a retainer element surrounding the expansion plug in spaced relation thereto, said retainer being attached to said member to be secured; a plurality of resilient fingers attached to the other member to be secured, said fingers extending into the space between the expansion plug and the retainer element in the holding position and being adapted to be pressed into frictional holding contact with the surfaces of the sleeve and the retainer element whenever sufficient fluid pressure is applied to the plug while the fingers are in the holding position; means for releasing the fluid pressure causing release of frictional holding contact between the sleeve, the fingers, and the retainer element; a safety valve adapted to selectively block the means applying fluid pressure to the expansion plug; biasing means urging the safety valve continuously into its blocking position; and means for forcing the safety valve open when the fingers are in their holding position between the sleeve and the retainer element.

15. A method of producing an expansion plug having a thin cylindrical, resilient, expansible outer portion of substantially uniform, predetermined thickness enclosing a plurality of interconnected annular spaces, which comprises: cutting grooves in the side wall of a substantially cylindrical shaped core to produce spaced parallel ridges about its external surface, said ridges having substantially equal external diameters; cutting at least one passage through each of said ridges to connect the grooved spaces on either side of the ridge; fitting a cylindrically-shaped metal sleeve having a uniform internal diameter substantially equal to the outer diameter of the core over the core and attaching said sleeve to the core at the top and bottom peripheries; and reducing the outer diameter of the sleeve by an amount sufficient to produce said predetermined thickness for the sleeve.

References Cited in the file of this patent

UNITED STATES PATENTS

| | | |
|---|---|---|
| 1,183,213 | Lewis | May 16, 1916 |
| 2,338,069 | Horton et al. | Dec. 28, 1943 |
| 2,539,991 | Chapman | Jan. 30, 1951 |

U. S. DEPARTMENT OF COMMERCE
PATENT OFFICE

CERTIFICATE OF CORRECTION

Patent No. 2,824,508                       February 25, 1958

Wilbur C. Gates

It is hereby certified that error appears in the printed specification of the above numbered patent requiring correction and that the said Letters Patent should read as corrected below.

Column 3, line 5, for "metchanism" read -- mechanism --; column 4, line 74, for "with" read -- within --; column 9, line 2, for "contact" read -- contract --.

Signed and sealed this 29th day of April 1958.

(SEAL)

Attest:

KARL H. AXLINE

Attesting Officer

ROBERT C. WATSON
Commissioner of Patents